United States Patent Office 3,518,065
Patented June 30, 1970

3,518,065
PROCESS FOR PREPARING STOICHIOMETRIC URANIUM DIOXIDE
Leonard Vincent Triggiani, Silver Spring, and Irving Charles Stone, Ashton, Md., assignors to W. R. Grace & Co., a corporation of Connecticut
No Drawing. Filed Apr. 23, 1968, Ser. No. 723,561
Int. Cl. C01g 43/02
U.S. Cl. 23—355                         1 Claim

ABSTRACT OF THE DISCLOSURE

A process for preparing urania microspheres, useful as fuel particles, in which the oxygen to uranium ratio is reduced to 2.0 by passing a reducing gas, such as hydrogen, through the particles at a temperature of about 300° to 800° C. and then densifying the particles by sintering at 1050° to 1150° C.

---

This invention relates to a process for preparing urania fuel particles. In one specific embodiment, it relates to a method of preparing urania microspheres by reducing the oxygen to uranium ratio in the microspheres to essentially the 2.0 ratio. This is accomplished by passing a reducing gas, such as hydrogen, for example, through a heated bed of the microspheres.

One of the recent developments in the nuclear energy field has been the development of fuel elements from sols by the microsphere route. These microspheres have desirable physical properties in that they can be sintered to high density at much lower temperature than was possible when the fuel elements were prepared by conventional ceramic techniques. The microspheres range in size from a few microns up to 1500 microns and provide a very convenient method of handling nuclear fuels. One of their desirable properties is porosity. The microspheres and other particles formed from sols have sufficient porosity to allow impregnation of the spheres with other materials. A mixed fuel, for example, can be prepared by impregnating a urania microsphere with a fissionable actinide oxide component, such as $U_{235}$-plutonium or thorium, for example.

One of the problems arising when urania is used as the matrix in such an impregnation reaction is that the compound designated "uranium dioxide" can take up oxygen until the oxygen to uranium ratio is as high as 2.4 without losing its crystalline structure. The range of compositions which do not lose oxygen except at very high temperatures extends considerably beyond $UO_{2.00}$, probably up to about $UO_{2.15}$. The oxygen taken up in excess of $UO_{2.15}$ is comparatively loosely bound and can be driven off by heating in vacuum. Even through the urania microspheres are prepared from carefully reduced $UO_2$ sols, the final product has an oxygen to uranium ratio in the range of 2.0 to 2.4. This phenomenon results from the admixtures of hexavalent uranium oxide with the quadravalent uranium oxide. Hexavalant urania is more soluble in aqueous medium than quadravalent urania. If the urania microspheres that are hyper-stoichiometric in oxygen are not reduced to stoichiometric uranium dioxide, the hexavalent uranium causes the formation of inter-particle sludge when the impregnating solution is added to the microspheres. This is obviously undesirable since it interferes with the adsorption of the impregnant and result in undesirable final products.

We have found that uranium bearing microspheres can be prepared as very nearly stoichiometric $UO_2$ by heating the microspheres in the presence of a current of hydrogen gas.

Our process has several advantages. One of the advantages results from the fact that our process can be operated at temperatures substantially below the melting point of the uranium.

Another advantage of our process is that it can be used to prepare very nearly stoichiometric $UO_2$ from microspheres that have a oxygen to uranium ratio as high as 2.4. This is obviously advantageous in that it eliminates the steps in the preparation of the urania added to keep the oxygen to uranium ratio as close to 2.0 as possible.

Our novel process will be described using urania microspheres, although it is obvious that it is equally applicable to the preparation of nearly stoichiometric $UO_2$ from urania having any particle size that can be conveniently handled in conventional equipment. The only limitation in our process is that the particles be small enough to assure penetration of the hydrogen into the particles during the process. Particle pore volumes of 0.4 to 1.0 cubic centimeter per gram give satisfactory results.

The first step of our process is the selection of the uranium microspheres to be treated. As pointed out above, our process gives satisfactory results when the urania particles have an oxygen to uranium ratio as high as 2.4, the maximum that is typically found in a nominally uranium dioxide product.

In the second step of our process, the microspheres are transferred to a suitable furnace equipped with hydrogen gas inlet. The spheres are heated in the furnace to a temperature of about 300 to 800° C., preferably about 500° C. The time of heating the microspheres is, of course, dependent on the size of the spheres and the temperature. We have found very satisfactory results are obtained when microspheres in the 20 to 500 micron size range are heated to a temperature of about 500° C. for a period of about 3 hours. However, satisfactory results have been obtained on heating to 300° to 800° C. for about 1 to about 10 hours, depending on the temperature. Since the reaction is complete in about 3 hours at about 500° C., no additional advantage is achieved by continuing the heating beyond this period of time.

In addition to preparing urania particles for impregnation, our novel process can be used as a pre-treatment step in other processes. Carbide particles can be prepared, for example, by preparing urania microspheres containing an excess of carbon, reducing the oxygen to uranium ratio using our process and converting the microspheres to the carbide by calcination at about 1000° to 2000° C. for about 2 to 24 hours.

Our process will be further illustrated by the following specific but non-limiting examples.

EXAMPLE I

In actual practice, the amount of hyper-stoichiometric oxygen available in urania is variable. This example shows a method of preparing uranium carbide wherein the urania used in the preparation is pretreated using our novel process.

The equation for oxygen removal and carbide formation would most properly be written in the form:

$$UO_{2+x} + (3+X)C \rightarrow UC + (2+X)CO$$

It would be problematical from the control point of view to try to match the amount of available carbon with the variable oxygen content. The process of this invention provides a simple, straightforward method of effecting this adjustment.

The microspheres used in this example were prepared from a urania sol containing colloidal carbon prepared by mixing a urania sol containing 10 weight percent carbon. An electron micrograph of the urania sol showed dense particles about 10 millimicrons in diameter. The carbon used to prepare this product was the carbon sold commercially as Cabots Regal SRFS having a particle size of about 56 millimicrons. The sol was prepared by mixing the carbon with dilute ammonia and the surface active agent sold commercially under the tradename of Daxad 11.

The urania sol was prepared by electrodialysis of a uranyl chloride solution at 60° C. The mixed sol was dried to the microspheres by settling through a countercurrent flow column of hot hexanol of controlled temperature and water content. The water was exchanged to the solvent and removed from the solvent in a second distillation step. The equipment used for this run was a 7 foot column, 3 inches in diameter, equipped with a double valve system at the bottom for separating the dried spheres from the hexanol and for collecting the dried spheres that settled through the solvent mixture.

Approximately 50 grams of the "green" uranium oxide-carbon microspheres prepared by this technique were transferred to each of two graphite crucibles. The microspheres had a uranium to carbon molar ratio of 2.37. The crucibles were inserted in ceramic tubes between silicon carbide heating elements of a 2-tube Burrell furnace. In order to check on the first step of the process, two samples were placed in separated ceramic tubes in side by side relationship in the hot zone of the furnace. Hydrogen gas flow was started through the 2 tubes and temperature was increased to 500° C. over a period of one hour and maintained at that temperature for a period of 3 hours to remove excess oxygen from the uranium dioxide.

The effectiveness of this conversion was demonstrated by changing the sweep gas to argon and increasing the temperature to 1500° C. over a 3.5 hour period. The temperature was maintained for a period of 16 hours. The product, uranium carbide, had a unit cell of 4.922 A. as compared with 4.995 A. for pure UC.

EXAMPLE II

An analytical technique was perfected to determine the oxygen to uranium ratio in samples of the oxides.

In this scheme of analysis, the uranium (VI) content of dissolved uranium dioxide was determined and directly correlated with excess oxygen. This was accomplished by dissolving the samples in phosphoric acid under an argon atmosphere and determining the uranium (VI) content polarographically.

From the equivalence of U (VI) to excess oxygen, the oxygen to uranium ratio is calculated using the formula:

$$O/U = 2.00 + A$$

where A is the abundance of U (VI) in the sample.

The abundance of U (VI), A, in the sample is calculated from the equation:

$$A = CV/FW$$

where:
C = U (VI) content, mg./ml.
V = volume of solution, ml.
F = abundance of U in $UO_2$
W = sample weight, mg.

The value for F is 0.8815 for the pure and stoichiometric uranium (VI) oxide made from naturally occurring uranium. Thus, $UO_{2.0000}$ is 88.15 atomic percent uranium.

Typical analysis of oxygen to uranium ratios in various products ranging downwardly from pure $U_3O_8$ is shown in Table I following:

TABLE I

| Sample: | O/U ratio |
|---|---|
| A (Pure $U_3O_8$) | 2.660 |
| B | 2.416 |
| C | 2.386 |
| D | 2.370 |
| E | 2.401 |

These data show the typically wide variation in oxygen to uranium ratio that is found in the various materials prepared as untreated microspheres.

The utility of our process was demonstrated in a series of runs in which green microspheres were treated and the reduction in oxygen to uranium ratio noted. Typically the untreated microspheres had oxygen to uranium ratios of about 2.41. After pretreatment and sintering, the oxygen to uranium ratio was reduced to 2.04. The data collected in the series of these runs are set forth in Table II below:

TABLE II

| Sample | O/U Ratio | |
|---|---|---|
| | Before treatment | After treatment |
| A | 2.44 | 2.04 |
| B | 2.39 | 2.04 |
| C | 2.37 | 2.01 |
| D | 2.43 | 2.02 |

It is obvious from review of these data that the process of our invention defines an optimum method of reducing the oxygen to uranium ratio in the microsphere products to very nearly stoichiometric 2.00. This reduction prepared the microspheres for treatment to prepare carbides, nitrides, and other materials without problems of interference from excess free oxygen.

Obviously, many modifications and variations of the invention may be made without departing from the essence and scope thereof, and only such limitations should be applied as are indicated in the appended claim.

What is claimed is:

1. A process for preparing urania microspheres having an oxygen to uranium ratio of about 2.0 from microspheres having an oxygen to uranium ratio of about 2.4 and a pore volume of about 0.4 to 1.0 cubic centimeter per gram which comprises heating the microspheres to a temperature of about 300–800° C. for about 1 to 10 hours in an atmosphere of hydrogen and densifying the microspheres by sintering at temperatures of about 1050 to 1150° C. for a period of about 2–24 hours.

References Cited

UNITED STATES PATENTS

| 3,230,278 | 1/1966 | Bauschman et al. | 23—355 |
| 3,227,514 | 1/1966 | Vertes et al. | 23—355 |
| 3,189,666 | 6/1965 | Levey et al. | 23—355 |
| 3,087,781 | 4/1963 | Levey et al. | 23—355 |

OTHER REFERENCES

Aronson et al., Kinetics of the Reduction of $U_4O_9$ in $H_2$, J. Inorg. Nucl. Chem., vol. 7, pp. 384–91, 1958.

LELAND A SEBASTIAN, Primary Examiner